Figure 6:
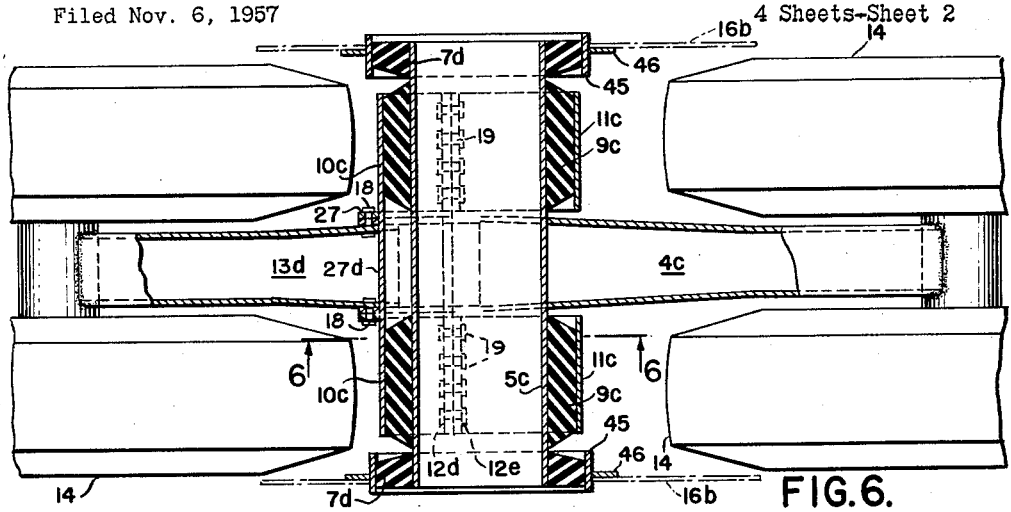

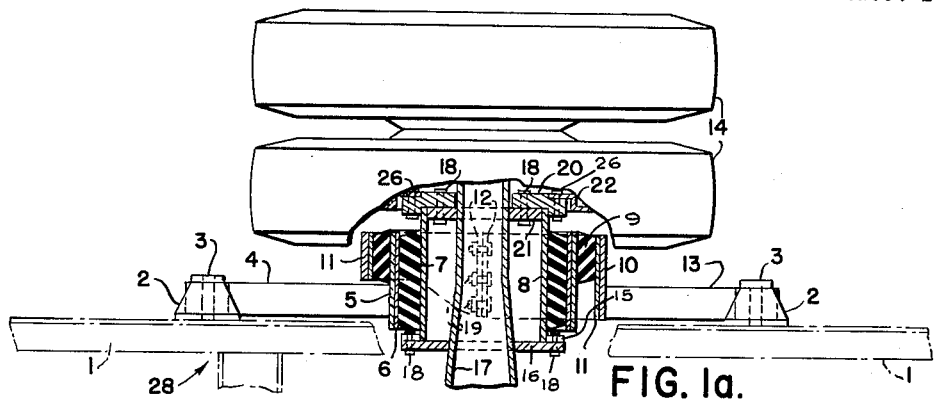
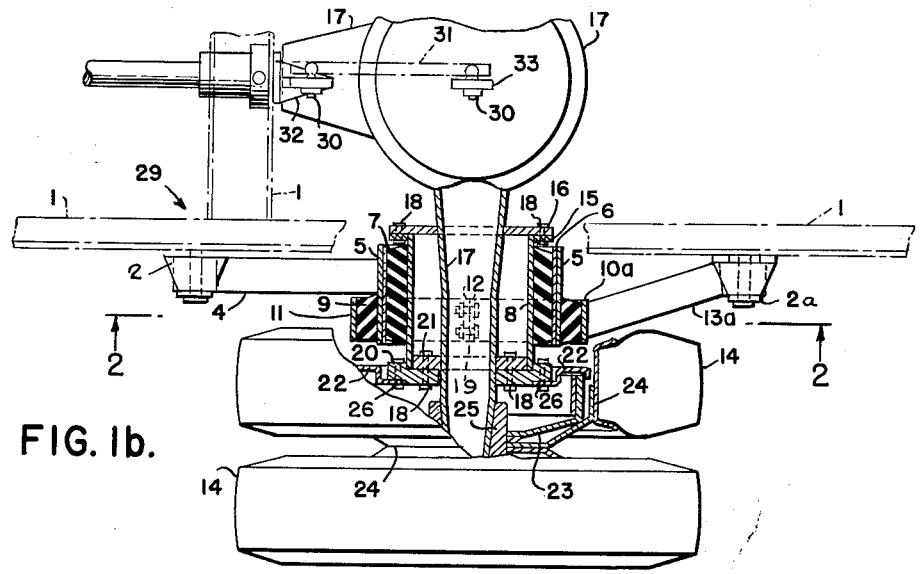
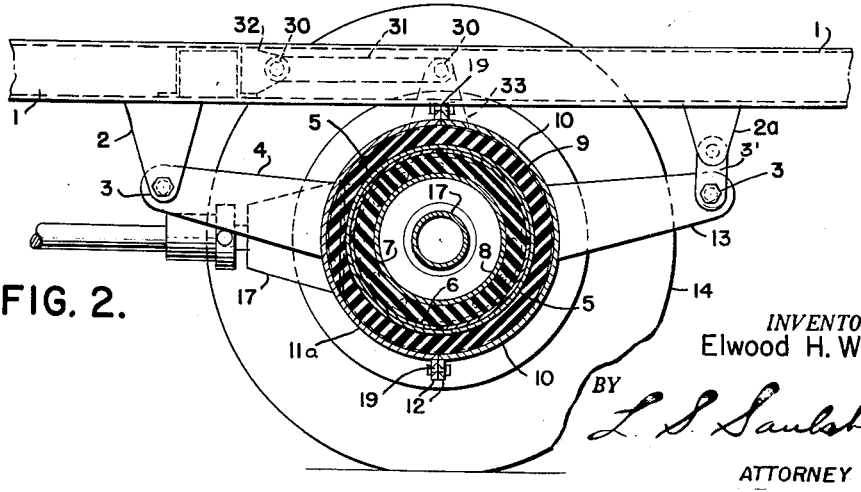
FIG. 1a.
FIG. 1b.
FIG. 2.
INVENTOR.
Elwood H. Willetts
ATTORNEY INVENTOR.
Elwood H. Willetts
BY
L. S. Saulsbury
ATTORNEY Dec. 19, 1961 E. H. WILLETTS 3,013,808
TORQUE REACTIVE STRUCTURE
Filed Nov. 6, 1957 4 Sheets-Sheet 3

INVENTOR.
Elwood H. Willetts
BY
L. S. Saulsbury
ATTORNEY

Dec. 19, 1961  E. H. WILLETTS  3,013,808
TORQUE REACTIVE STRUCTURE
Filed Nov. 6, 1957  4 Sheets-Sheet 4

INVENTOR.
Elwood H. Willetts
BY
L. S. Saulsbury
ATTORNEY

United States Patent Office 3,013,808
Patented Dec. 19, 1961

3,013,808
TORQUE REACTIVE STRUCTURE
Elwood H. Willetts, 320 Kenmore Road, Douglaston, N.Y.
Filed Nov. 6, 1957, Ser. No. 694,789
9 Claims. (Cl. 280—104.5)

This invention relates to a torque reactive structure for use as a suspension for single and tandem axle motor vehicles and trailers, railcars, and for variable rate reversing mechanisms, cushioned stop and bumper constructions, and so on according to the invention. The load is resiliently cushioned by tubular rubber bushings torsionally stressed in angular shear and secured to the hubs of opposing suspension arms supported by resilient cylindrical rubber bushings disposed on a mounting shaft which may also support like structures laterally adjacent thereto, to provide controlled freedom of angular alignment of the arms in all directions, and of movement of certain like suspension arms between like structures.

As applied to vehicles, the structures may be attached or secured by their concentrically-disposed supports to the vehicle body framing, with the opposing suspension arms extending therefrom to tandem driving, steering, or trailing axles with ground bearing wheels, tires or track treads. Or, the structures may be attached to opposite ends of a single driving, steering or trailing axle or track supports, with the opposing suspension arms extending therefrom to a body structure of the vehicle.

The principal object of this invention is to provide a controlled gimbals structure for opposing torque reactive support arms by means of tubular rubber bushings stressed in radial and compound angular shear.

It is another object of this invention to provide a resilient suspension for a vehicle or a railcar which will control a distribution of the load between the respective support wheels of the suspension, control their relative alignment on a longitudinal plane, and provide controlled angular freedom therefor.

It is still another object of this invention to provide a torque reactive structure that has opposing torque reactive arms of unequal length which will provide equal support at the free ends of the opposing arms.

It is still another object of this invention to provide a torque reactive structure that has opposing torque reactive arms of equal length which will provide unequal support at the free ends of the opposing arms.

It is a further object of this invention to provide a torque reactive structure that has opposing torque reactive arms of equal length which will provide equal support to the free ends of the opposing arms.

It is a still further object of this invention to provide a suspension structure that has a pair of opposing torque reactive suspension arms of equal length which will provide equal support to a body attached to the free ends of both suspension arms of each structure and momentarily transfer imbalance of torsional stress between an arm of one structure and the respective like arm of its pair mate of the adjacent structure.

It is a still further object of this invention to provide a suspension structure that has torque-reactive suspension arms of unequal length which will equally distribute a body load to tandem axles attached to the outer ends of both suspension arms.

It is a still further object of this invention to provide a suspension structure that has torque reactive suspension arms of equal length which will unequally distribute a body load to tandem axles attached to the outer ends of both suspension arms.

It is a still further object of this invention to provide a torque reactive opposing suspension arms structure for heavy duty and/or, off-highway vehicles in which the suspension structure is mounted on a multiple of axles or spindles comprising a group support for a vehicle, with certain of the arms of adjacent axle or spindle suspension structures interconnected to opposing ends of load equalizing beams pivoted to the body structure, and with certain other of the suspension arms interconnected through shackle links to said beams or other equalizing beams pivoted to said body structure whereby to provide cumulative vertical travel of certain of the ground contacting wheels or track treads of the suspension system.

It is a still further object of this invention to provide a system of torque reactive structures with opposing suspension arms of equal length which will equally distribute the load to tandem axles attached to the outer ends of both suspension arms whereby to relieve the supported body framing of suspension torque reactions.

It is still a further object of the invention to provide a torque reactive suspension system in which tubular rubber bushings are interposed between the structure supporting shaft and a suspension arm hub to cushion the load through radial compression of the bushings, and at the same time further cushioning the load through the rubber bushings stressed in angular shear and interconnecting the opposing torque reactive suspension arms.

It is a still further object of this invention to provide a torque reactive suspension system in which all of the tubular rubber bushings are secured to one shaft.

It is a still further object of this invention to provide a cushioned wheel suspension structure for a vehicle, which suspension structure will also cushion the torque reaction of both drive and brake loads.

It is a still further object of this invention to provide an unusually resilient torque reactive suspension structure for a relatively light vehicle in which abnormally high drive and brake torque reactions exist, as required of special vehicles traversing extremely rugged terrain, as with track treads, and the like.

It is a still further object of the invention to resiliently transfer an imbalance of suspension torque reaction between opposite sides of a vehicle to reduce transverse roll while traversing laterally uneven terrain.

It is a still further object of the invention to provide a suspension structure which can be detachably secured to a vehicle axle that has provision for using conventional brake mountings, with means for accurately remounting such brake mountings and wherein this can be done without the use of special tools or fixtures.

It is a still further object of the invention to provide a suspension structure in which axial cushioning of a vehicle is effected through axial shear of the tubular rubber bushings of the structure that are normally stressed in angular shear.

It is a still further object of the invention to provide a suspension structure which has unbroken surfaced shafts around which each of the concentrically disposed tubular rubber bushings are bonded and stressed in angular shear, and to provide radially compressed means bonded to the outer periphery of the tubular rubber bushings whereby both inner and outer diameter bonds of the rubber are enhanced.

It is a still further object of the invention to provide in a suspension structure an opposing arm, torque reactive arrangement in which the torsion bushings interconnecting the opposing arms is offset in its encirclement of the respective hubs, so as to enable transverse alignment of longitudinally-extending opposing arms without offset between the hubs and the free end of the arms.

It is a still further object of the invention to provide a suspension structure that has the supporting rubber bushings disposed in balanced relationship to the load bearing wheels or track treads through which road impacts are transmitted to the suspension structure.

Other objects of the present invention are to provide an opposing arms, torsion rubber suspension structure, having the above objects in mind, which is of simple construction, constructed of a minimum number of simple parts, easy to assemble and of long life, to provide maximum cushioning with minimum weight, requiring no lubrication or adjustments, compact, durable, effective and efficient in use.

Figure 7:
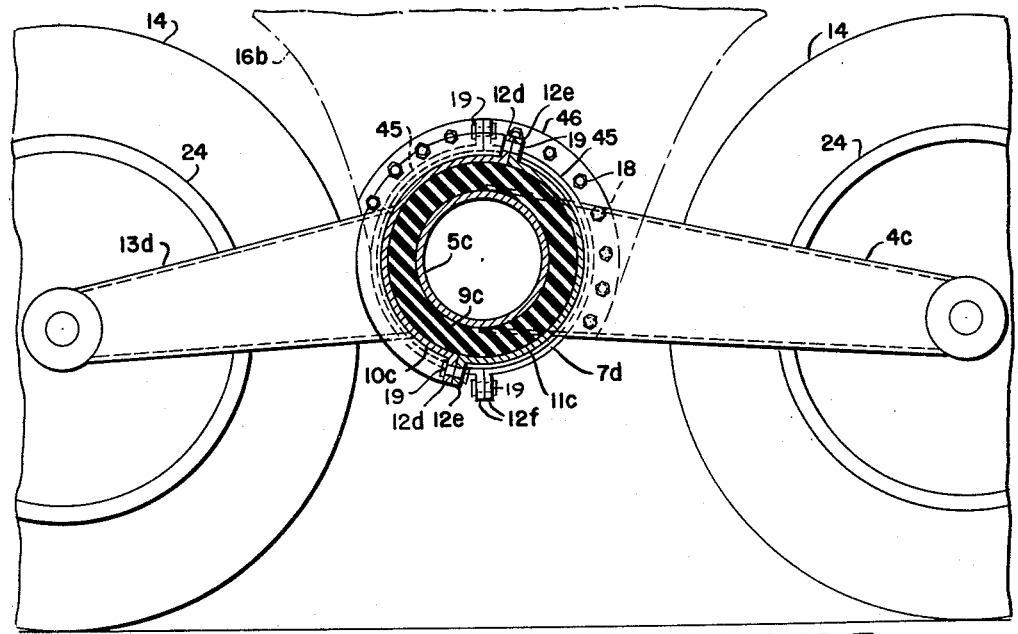
Figure 3:
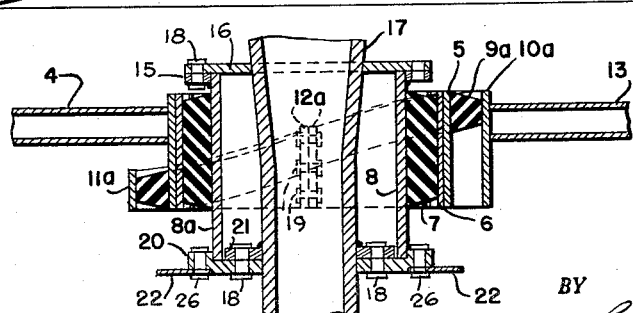
Figure 4:
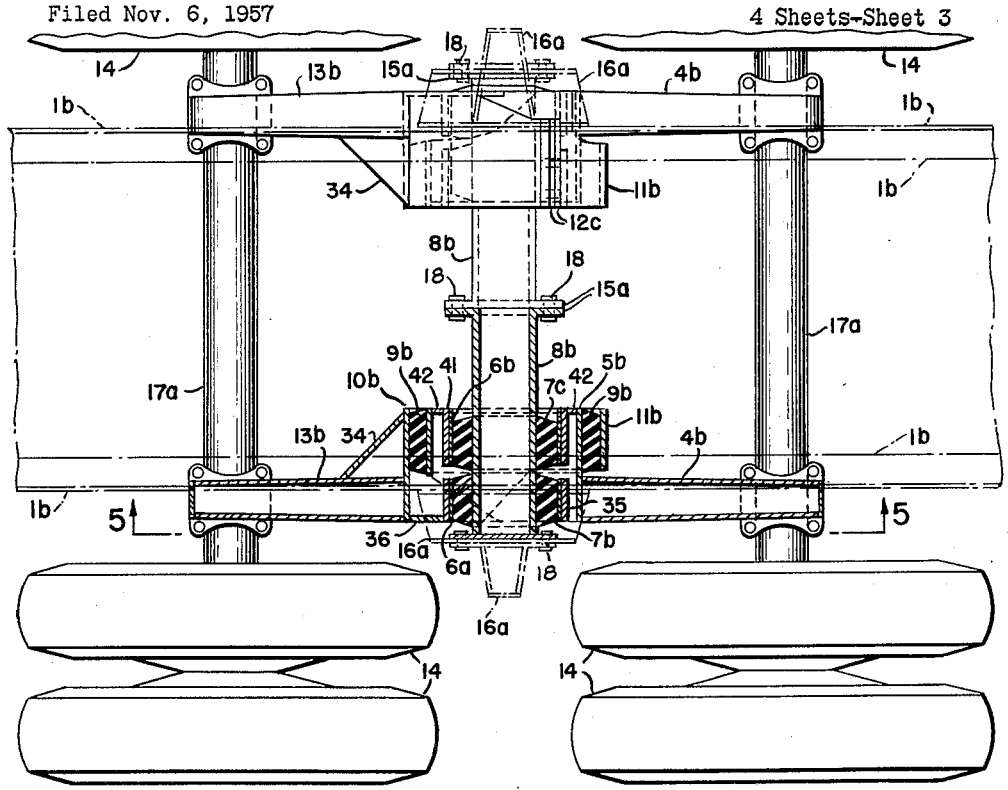
Figure 5:
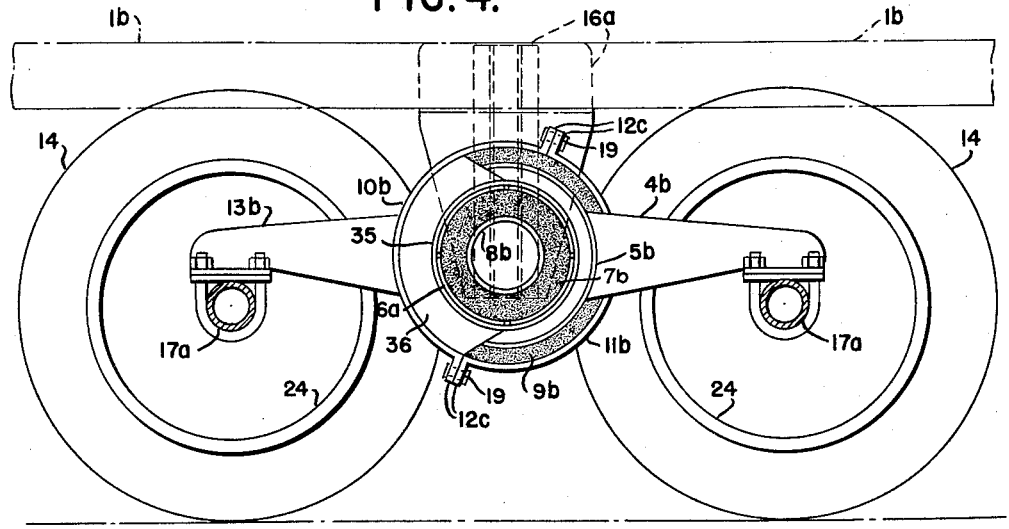
Figure 8A:
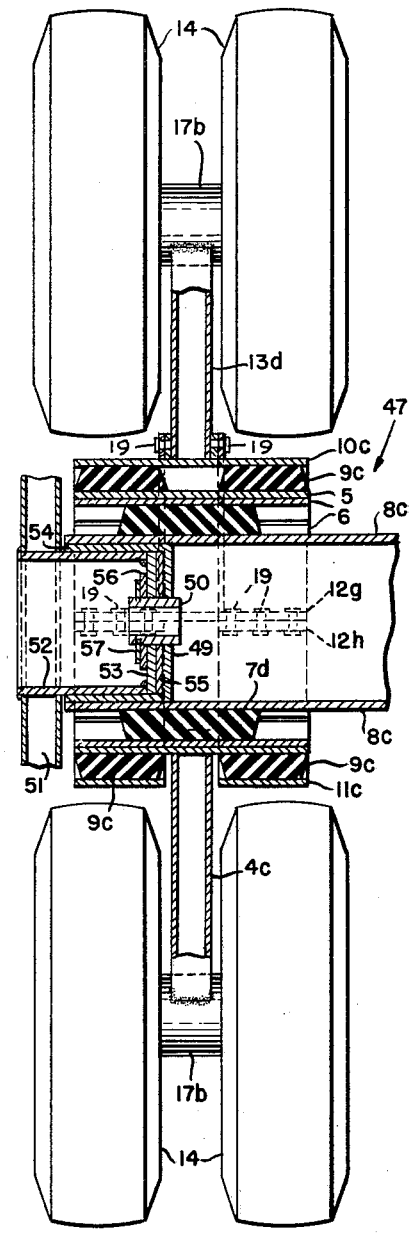
Figure 8B:
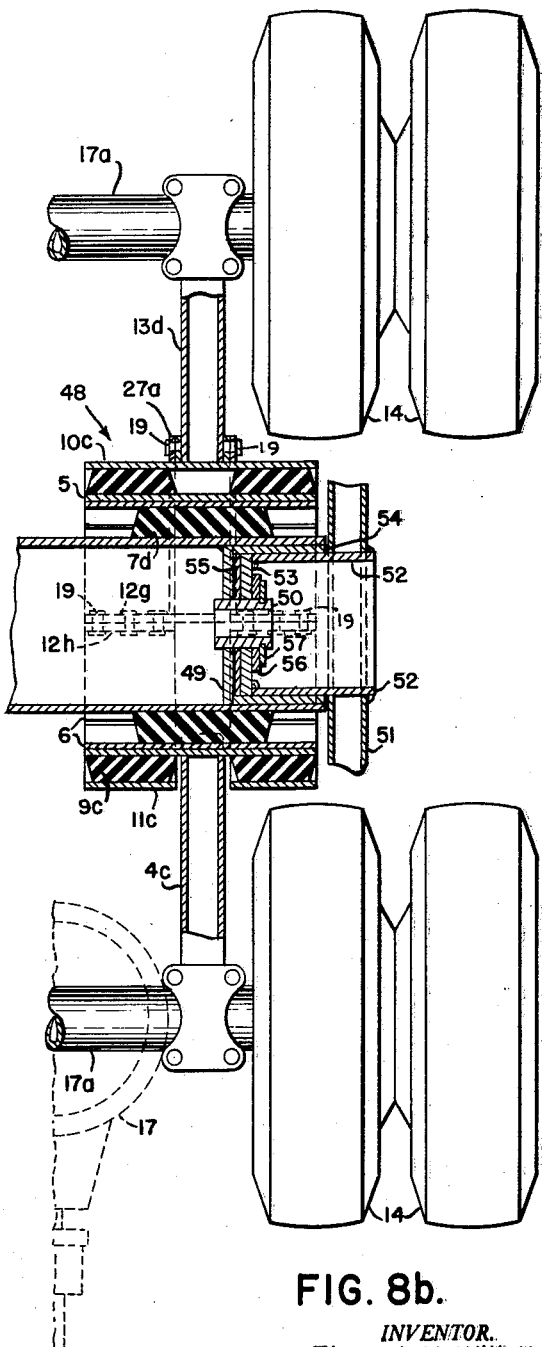

For other objects and for a better understanding of the invention, reference may be had to the following detailed description taken in connection with the accompanying drawings, in which FIGURE 1a is a top plan view of a suspension arms structure according to one form of the invention which has the non-offset suspension arms, with portions being broken away and the interior parts shown in section, FIG. 1b is a similar top plan view of another form of the invention which has one of the suspension arms offset, the portions being similarly broken away to show the interior construction thereof, FIG. 2 is a longitudinal side elevational view of a suspension structure as shown in FIG. 1b, FIG. 3 is a fragmentary sectional top plan view of still another form of the invention wherein the torsional suspension bushing is offset laterally adjacent the suspension arm that is secured to the hub on which the bushing is bonded, FIG. 4 is a sectional top plan view of still another form of the invention wherein the primary suspension bushing is supplemented by secondary bushings connected to each of the opposing suspension arms, and shown mounted on the body framing, and the free ends of the opposing suspension arms connected to a pair of tandem axles with axle brake or drive torque taken through the suspension arms, FIG. 5 is a longitudinal side elevational view of the suspension structure shown in FIG. 4, FIG. 6 is a fragmentary sectional top plan view of one of a pair of separate suspension structures constructed according to a further form of the invention wherein wheel carrying spindles project laterally on both sides of the free ends of the opposing suspension arms; and especially adapted for automatic self-steering and for controlled axial freedom about the centerline of the suspension arms; and illustration made as to the manner of mounting the structure on the body framing, FIG. 7 is a longitudinal side elevational view of the suspension structure shown in FIG. 6, FIG. 8a is a fragmentary sectional top plan view of one of a pair of suspension structures according to a still further form of the invention wherein a cross leveling effect is provided between opposite sides of the suspension by mounting the cross shaft in low friction bearings with thrust washers, the respective components arranged to operatively tie the structure transversely to both hubs and the vehicle frame, and wherein wheel carrying spindles project laterally on both sides of the free ends of the opposing suspension arms, and FIG. 8b is a similar fragmentary sectional top plan view of one of a pair of suspension structures according to a still further form of the invention and in which the free ends of the suspension arms are connected to transversely-extending axles spaced longitudinally of the body framing.

Referring now particularly to FIGURES 1a and 1b, there is shown respectively torque-reactive opposing suspension arms structures 28 and 29 that may be mounted on opposite ends of an axle 17. The arms structure 28 has a non-offset suspension arm secured to the outer hub as viewed at the right of FIG. 1a and the arms structure 29 differs therefrom only by having its corresponding suspension arm secured to the outer hub that is laterally offset throughout its length as viewed at the right in FIG. 1b, otherwise suspension arms structures are the same. In both structures 28 and 29, like parts have been given the same numeral designations.

A hollow support shaft 8 is secured at its inner end by a flange 15 to an axle flange 16, and at its outer end by a pilot flange 20 to an axle flange 21, both flanges 15 and 20 being secured by bolts 18 to their respective axle flanges. Pilot on flange 21 and matching seat bore on flange 20 insure radial centering of flange 20 on which a standard brake assembly mounting plate 22 is likewise piloted, and secured thereto by bolts 26, thereby providing concentric relationship between brake assembly mounting plate 22 and brake drum 23 mounted on rotating hub 25 journalled on the axle 17. Wheel 24 with its tire or tires 14 are likewise mounted on hub 25 in the usual manner.

The inside diameter of support shaft 8 exceeds the outside diameter of axle flange 21 so the suspension arms structure may be pushed over the end of axle 17 into the home position as shown in FIGS. 1a and 1b and secured to axle 17 at flanges 15, 16, and 20, 21, by the bolts 18.

The brake mounting plates 22 on which the brake operating parts including internal brake shoes not shown, may have been pre-assembled and premounted on suspension arm structures 28, 29 before they have been secured to axle 17, and thereby assembled upon the axle therewith. The brake mounting plates 22 may be attached or removed at any time after the arm structure has been mounted on the axles. The wheel hub with its brake drum, wheels and tires may also be mounted on the axle or removed therefrom in the conventional manner.

A tubular rubber bushing 7 is bonded to the outer surface of shaft 8, and a split sleeve 6 having four radially divided parts is bonded to the outer diameter of the bushing 7. After vulcanizing and bonding, the bushing 7 is allowed to cool, during which cooling, the rubber shrinks and the predetermined spaces between the four sections of split sleeve 6 are free to contract and prevent the tension which would otherwise develop if the bushing 7 were bonded into a solid sleeve. A tight fitting hub 5 is then pressed over the interspaced sections of split sleeve 6, radially compressing the rubber between the shaft 8 and the split sleeve 6. Hub 5 and sleeve 6 may be secured together by cement, keys, or by welding the ends of sleeve 6 to the hub extending sufficiently beyond rubber bushing 7 to avoid heat damage thereto. A non-offset suspension arm 4 is secured directly to its hub 5, while its free end offers support to a vehicle or railcar frame 1 through its bracket 2 and pin 3. Where a shackle link 3' is used on an end of a suspension arm the frame bracket 2 may take the form shown at 2a in FIGS. 1b, 2.

Laterally adjacent to arm 4, a rubber bushing 9 interconnects hub 5 and a cylindrical split hub having two parts 10, 11 is bonded to both, after which split hub parts 10, 11 are compressively clamped at flanges 12, 12 by bolts 19 to radially compress the bushing 9 between the hub 5 and the split hub 10, 11.

An opposing suspension arm 13 is secured to split hub part 10 and has its free end connected with another frame bracket 2 spaced from the first mentioned bracket 2 that supports arm 4. In FIG. 1b it will be seen that the opposing arm 13a is offset in its length to permit its connection to a hub 10a, 11a at the center of the bushing 9.

The split hub 10, 11 or 10a, 11a is outwardly disposed of arm 4 to afford greater clearance under frame 1; or it may be disposed inwardly of hub 5.

A load on the free end of suspension arm 4 tends to rotate the arm about the center of its hub 5, creating a torsional shear stress in bushing 9 which stress is resisted by split sleeve hub 10, 11 secured to opposing arm 13 similarly loaded at its free end.

Where mounting shaft 8 is free to rotate with hub 5 of arm 4, inner bushing 7 will not be torsionally stressed (except by dynamic brake or drive torque reactions), thus bushing 7 would not supplement the static load capacity of bushing 9, and equal load support would be provided at the free ends of arm 4 and its opposing arm 13, provided they are of equal support length.

Where this suspension system is applied to motor truck drive axles or to trailing axles with brakes, the brake and/or, drive torque reactions move along a path from axle 17 through flanges 15, 16 and 22 or 21 to 20 and to shaft 8 which is bonded to bushing 7 where the reaction is offset by torsional stress in bushing 7 outwardly bonded to split sleeve 6 secured to hub 5 of arm 4, that is attached to frame 1 at bracket 2.

Thus, under static suspension load the axle 17 will oscillate with arm 4 centered about bracket 2; and under the dynamic load reaction from brake or drive torque will oscillate in the hub 5 of arm 4 against twice the torsional capacity of bushing 7 as there is one bushing 7 on each end of axle 17. The structure of the invention thus provides in effect a rubber bushed radius rod which is also a rubber spring cushioned torque arm, integral with a torque reactive suspension wherein the bushing 7 provides a resilient connection between the axle and the torque reactive elements of the suspension proper.

Where this suspension is applied to a motor truck driving axle with independent provision against torsional oscillation, for example with a torque arm assembly as shown in FIGS. 1b and 2, by having adjacent the center of the width of the vehicle on axle 17, a torque arm 33, swivel bolts 30, rod 31, and a frame bracket 32 secured to frame 1, the axle 17 is cushioned against torsional restraint by torque arm 33 by the rubber bushings 7 in the hub 5 of arm 4 acting as a combined torque and radius rod.

Such restraint of torsional movement in an axle by the torque arms assembly including the arms 30 to 33 inclusive, or any other type of torque arm assembly, restrains shaft 8 of the suspension to which bushing 7 is bonded, thus suspension arm 4 is restrained by the torsional capacity of said bushing 7 as well as by the torsional capacity of bushing 9 reacting from opposing arm 13. Thus where suspension arms 4 and 13 are of the same load length, arm 4 will support a greater load than arm 13; while if both arms are to support equal loads, arm 4 must be proportionally longer than arm 13 as the torsional capacity of bushings 7 and 9 exceed the respective capacity of bushings 9 alone.

This novelty of design is desirable in various important applications of a suspension system, as wherein arm 4 is disposed forwardly of an axle located longitudinally close to the rear end of a truck frame, and wherein a long radius rod effect is desired as through arm 4. Regardless of independent torsional restraint means, or not, bushing 7 on each end of axle 17 enables arm 4 on one end of the axle to oscillate independently of its pair mate arm 4 on opposite end of the same axle; such flexure being essential in a suspension which must traverse rough and uneven terrain.

In the form of the invention shown in FIG. 3, a bushing 9a differs from the bushing 9 shown in FIGS. 1a and 1b, wherein an arm 4 its opposing arm 13 are both without offset throughout their length and yet are attached to their respective hubs opposite the center of the bushing. This is accomplished by a lateral offset in bushing 9a which offset starts adjacent the centerline of arm 13 and continues circumferentially to a point adjacent the diametrically opposed arm 4 where the adjacent sides of said bushing 9a and arm 4 are laterally spaced apart to provide desired clearance therebetween throughout the range of counter oscillations of opposing arms 4 and 13 and semi-cylindrical split sleeve 10a', 11a'.

While FIGS. 1a, 1b and 2 show a construction of the invention secured to the axle 17 of a vehicle, it is to be understood that the same construction of the invention is similarly applicable for securing the structure directly to the body frame of a vehicle. Where the suspension is directly secured to the vehicle frame (or body structure, as some vehicle bodies are integrally framed, hence herein the term frame, vehicle frame and body frame shall be similarly construed) the shaft 8 shown in FIGS 1a and 1b would extend transversely across the major width of the body frame, and be secured to it. The free ends of the suspension arms will be attached to opposite ends of transversely-extending axles disposed longitudinally of the body frame and provided with ground support element, the attachment being made at conventional beam hanger brackets under the drive axles of a motor vehicle provided with conventional torque arm assembly shown in FIG. 1b and 2, or to standard brake anchorage flanges, to spring seats of standard vehicle axles, or in any other suitable manner.

The suspension arm structures according to another form of this invention are such that the free ends of the two pair of opposing suspension arms of a structure are directly secured to the body framing and may carry laterally projecting wheel spindles for supporting individual wheels longitudinally aligned parallel to the arms, as shown in FIG. 6, thus to utilize the inherent resiliency of the bushings in the hub of said arms to enable each tire to equally accommodate itself to transversely uneven ground as well as to longitudinally uneven ground, thereby reducing load concentrations on any one of the ground support element or tires. The individual mounting thereby of each wheel avoids the scuffing prevailing when two tires mounted on a single wheel are turned or moved in other than a straight line on an even surface.

In FIGS. 4 and 5, there is shown a form of the invention in which two of the structures are mounted laterally spaced from one another on the support shaft or hub 8b that is secured to the frame of a vehicle 1b, with the opposing suspension arms 4b, 13b of each structure that are respectively connected to the respective laterally-disposed, longitudinally-spaced axles 17a.

According to this construction, the opposing suspension arms 4b, 13b are both restrained torsionally by rubber bushings 9b and by one of rubber bushings 7b, 7c thus the radial load on shaft or hub 8b will be equally divided at the free ends of equal length opposing arms 4b, 13b. The bushings 7b and 7c will also be torsionally stressed in opposite directions. Bushing 7b is interconnected to shaft or hub 8b and to a four-sectional split sleeve 6a which is pressed into a tight fitting band 35. Band 35 is provided with a radially extending flange 36 which is secured to the inside of semi-cylindrical split sleeve or hub 10b, 11b and to which arm 13b is attached. The securement of the flange 36 to the sleeve or hub part 10b is adjacent the outwardly secured arm 13b after bushing 9b has been bonded between sleeve 10b, 11b and hub 5b, and radially compressed therebetween by fasteners 19 extending through flanges 12c. Flange 36 may be secured to sleeve or hub part 10b by welding, as bushing 9b is sufficiently distant therefrom so the rubber cannot be subjected to the welding heat. Rubber bushing 7c interconnects shaft or hub 8b and the four-sectional split sleeve 6b which is likewise pressed into tight fitting band 41 to radially compress bushing 7c between shaft 8b and split sleeve 6b.

Hub 5b is coped at its outer end opposite arm 4b to provide clearance for radial flange 36 on band 35. Adequate clearance is thus obtained between the inside of hub 5b and the exterior of band 35 for the radial and angular deflections of the hub 5b relative to the band 35. Band 41 is provided with a radially extending flange 42 by which it is secured to hub 5b on which bushing 9b is bonded. Hub 5b is secured to arm 4b opposite the opposing arm 13b with which it is transversely aligned, sleeve part 11b being coped laterally adjacent the operating arc of arm 4b. The parts of semi-cylindrical split sleeve or hub 10b, 11b to which bushing 9b is bonded, are secured together at flanges 12c by bolts 19, thereby radially compressing rubber bushing 9b. A gusset 34 braces arm 13b where it is secured to split sleeve or hub 10b. Although not shown in FIG. 4, a rubber compression bumper block may be mounted on arm 4b or 13b with bumper stop secured to opposing arm on any of the constructions of the structures shown, to limit maximum oscillation of the suspension arms. Shock absorbers of any known type on the body framing may also be connected to the suspension arms to dampen the torque reaction.

This suspension arm structure may also be mounted on a single axle 17 of a vehicle and detachably secured to axle flanges 16, 21 as shown in FIGS. 1a, 1b, and 2, and where so mounted on an axle 17 torsionally restrained independently by parts 30, 31, 32, 33, the opposing arms 4b, 13b are both restrained by the bushing 9b and by one of the bushings 7b, 7c. It is understood that whether the mounting of the structure be made on a body frame, or on an axle, the load capacity of the structure will be unaffected. In other words, for compliance with an 18,000 pounds gross axle loading law, the suspension structure mounted on a body framing with arms connected to a pair of 18,000 pounds gross loaded axles, would require twice the torque of a suspension having arms of the same load length mounted on a single axle of 18,000 pounds gross.

In FIGS. 6 and 7, there is shown the form of the invention in which pairs of the suspension structures are secured on opposite sides of the body frame of a vehicle, with the free ends of the opposing suspension arms being connected to individually mounted wheels carried parallel adjacent both sides of each arm. The free ends of said opposing arms may, if desired, be connected to a pair of transversely disposed longitudinally-aligned axles as shown in FIG. 4.

However, the suspension arm structures may be secured to opposite ends of a single axle of either the driving, steering, or trailer type as shown in FIGS. 1a, 1b and 2, and where so secured, flanges 46, FIGS. 6 and 7, would be omitted from sleeve supports 45, which would then be provided with inwardly extending adapter flanges 15 and 20 to connect with bolt flanges 16 and 21 shown on axle 17 of FIGS. 1a and 1b.

In FIGS. 6 and 7, four rubber bushings 7d, 9c, 9c, 7d are shown bonded to shaft 5c to which arm 4c is secured between bushings 9c, which bushings are bonded to and radially compressed within semi-cylindrical split sleeves 10c, 11c provided with bolting flanges 12d, 12e, secured with bolts 19. Opposing suspension arm 13d is secured to sleeves 10c, 10c at bolt flanges 27 which extend circumferentially to flanges 12d. A semi-cylindrical filler 27d is disposed in the connection between the flanges 27 and the inner end of the arm 13d. Adjacent both ends of shaft 5c, the bushings 7d are bonded to and interconnect shaft 5c with the respective semi-cylindrical split sleeve supports 45, 45, each provided with two bolting flanges 12f secured by bolts 19 to radially compress bushings 7d therein. Radially disposed bolting flanges 46, secured to sleeve support 45, serve for attachment of each structure to the body frame provided with coacting bolt flanges 16b and connected by fasteners 18.

The bushings 7d, 7d take the direct radial load from the body frame and the torque load resulting from angular deflection of shaft 5c secured to arm 4c, which is supported at its free end by ground contacting wheels 24. For a uniform deflection of the opposing arms 4c, 13d the angular deflection in bushings 7d, will be but one half the deflection in the bushings 9c, which interconnect the opposing arms. Ordinarily, the radial load capacity of bushings 7d is of primary importance, thus their torsional capacity will usually be much lower than that of bushings 9c which carry the basic suspension load.

As arm 4c that is secured to shaft 5c oscillates, it is subject to the torsional stress in bushing 7d, and to the torque reactive stress in bushing 9c resulting from load on opposing arm 13d. Thus, for an equal distribution of the load from shaft 5c to the wheels at the free ends of arms 4c and 13d, arm 4c must be proportionally longer than arm 13d to absorb the additional torsional stress in bushings 7d.

An important feature of this invention is the combination of the absorption of direct torsional stress of rubber bushings 7d on arm 4c with reaction of said bushings 7d absorbed in body through framing flanges 16b, the balanced torque reaction on bushings 9c from opposing arms 4c, 13d, and the relative length of the opposing torque reactive arms 4c and 13d to equally distribute this imbalance of torque in arms 4c and 13d to the load bearing wheels 24. This combination assures "normal run" steering alignment control, by the wheels on the trailing "longer" arm 4c to the wheels mounted on the "shorter" arm 13d when that arm is mounted forward of shaft 5c in the normal direction of travel in which the vehicle generally moves.

Directional control of the path of tires 14, 14 on leading arm 13d is provided by the equally loaded tires on the longer and opposing trailing arm 4c that is rigidly connected to shaft 5c, on which the widely dispersed bushings 9c interconnect arm 13d, through clamped sleeve 10c, 11c, and bolt flanges 12d, 12e, 12e.

The resiliency of the rubber bushings and their arrangement and location on the central mounting shaft 5c enables the structure to provide a self steering effect. The imbalance of torque applicable to the opposing suspension arms through the novel construction of the structures enables a positive control by trailing tires secured to the longer suspension arm 4c over leading tires on a shorter opposing arm 13d of the structure, while all of said tires are equally loaded. These several features apply in varying degrees to all forms of the invention.

The radial-torsion bushings 7d provide a five degree range of axial freedom both laterally and longitudinally of the vehicle structure to (1) afford uniform tire contact over transversely uneven ground for the structure on each side of the vehicle independently, and (2) to afford a like degree of self-steering effect longitudinally as the direction of the vehicle structure is changed in relation to the then current rolling path of its tires. Where the tires are mounted independently, such mounting and this self-steering effect have been found by years of test to reduce tire scuffing, a major cause of tire wear, and to reduce the path "cut-in" of the bogie tires of a trailer traveling a sharp curve, especially as at the intersection of two narrow streets.

The advantages of individual tire mountings as shown in FIGS. 6 and 7, and of self-steering as referred to herein, are described more fully in applicant's co-pending application Serial No. 629,110, filed December 18, 1956.

It will be apparent from the foregoing description that this suspension provides trouble free, simple and improved cushioning of movement in a system devoid of adjustments or need of lubrication, while also providing the advantage in highway vehicle application of being several hundred pounds lighter than the currently used suspensions for thirty-six thousand tandem gross bogies.

In FIGS. 8a and 8b, there is provided a cushioned wheel suspension for a vehicle having wheels disposed about the free ends of a pair of opposing suspension arm structures 47 and 48 aligned transversely of the vehicle frame, on a single support shaft 8c attached to the frame by journal brackets 51, said wheels being optionally mounted on a pair of longitudinally-disposed transverse axles 17 and 17a as shown at 48 in FIG. 8b, attached adjacent their conventional spring seats or hangers, or where the wheels are mounted on stub shafts 17b as shown at 47 in FIG. 8a secured to each arm end, whereas the wheels are individually mounted parallel adjacent each arm. The construction may also be mounted on a single transverse axle as shown in FIGS. 1a and 1b by omitting parts 49 to 57 inclusive, and connecting the ends of opposing arms 4c, 13d, 4c, 13d to frame brackets 2 on frame 1 shown in FIGS. 1a, 1b and 2.

In FIG. 8b, the suspension structure 48 is shown connected to transverse axles 17 or 17a carrying tires 14, outwardly of suspension arms 4c and 13d, while the structure 47 in FIG. 8a is shown with the tires 14 supported from stub shafts 17b parallel to and adjacent both sides of each suspension arm 4c, 13d.

Journal bracket 51 that is detachably secured to each side of the body frame carries journal 32 which is provided with flush head 53 at inner end. These journals 52 support opposite ends of the transverse shaft 8c provided with co-operative heads 49. Low friction bushings 54 and thrust washers 55 are interposed between heads 53 and 49 so the journals 52 and shaft 8c are adjustably assembled laterally in journalled relationship by bolts 50 secured to head 49, with snap ring or nut 57 and thrust washer 56 outwardly of journal head 53. It is understood that a combined radial thrust bearing may be used instead of the bushing 54 and thrust washers 55, 56.

A tubular rubber bushing 7d interconnects and is bonded between shaft 8c and split sleeve 6. A tight fitting hub 5 is pressed over split sleeves 6 to radially compress the rubber bushing 7d between the shaft 8c and split sleeve 6. Arm 4c is secured to hub 5 and moves about shaft 8c due to the interconnecting rubber bushing 7d, and relative to its pair mate arm 4c similarly mounted on the opposite end of shaft 8c. This construction provides the required flexure to prevent undue stress in traversing transversely uneven ground, such stress being confined in the shaft 8c without being transmitted to the body frame owing to the bushings 54 at the journals 52. However, this transfer of torsional stress in shaft 8c from like arms 4c does provide a beneficial cross-leveling effect on the vehicle.

Opposing suspension arms 13d are secured to the semicylindrical split sleeves 10c, at the outwardly extending flanges 27a, extending one hundred and eighty degrees to the sleeve and clamping flange 12g to which matching flanges 12h, secure the other half of sleeves 11c to 10c to radially compress the torsional suspension rubber bushings 9c which interconnect hubs 5 and split sleeves 10c, 11c.

In FIGS. 8a and 8b, bushings 9c, are shown laterally adjacent both sides of arm 4c to enable its opposing arm 13d to be transversely centered in line with arm 4c and to provide clearance for the vulcanizing and bonding molds for bushings 9c laterally adjacent arm 4c which has previously been welded to hub 5.

The construction shown also provides for a lateral cushioning between the arms and the support shaft 8c rigidly secured transversely to the journal brackets 51 of the body frame. The bushings 7d and 9c, provide for maximum angular displacement of arms 4c and 13d independently about shaft 8c where the wheels are carried on stub shafts 17b since there is no transverse connection beyond the free ends of like arms of each laterally adjacent pair.

These rubber bushed opposing suspension arms resiliently position the axles 17 or 17a, or the spindles 17b longitudinally of the vehicle about the shaft 8c, while also taking the drive and brake torque reactions and balancing same, except where transverse axle 17 or 17a is provided with independent torque arm assembly 30—33 shown in FIG. 1a, or with axles 17a connected at beam hangers to the free ends of the opposing arms 4c and 13d.

Relative angular freedom of hub 5 about shaft 8c will be inversely proportional to the length and durometer hardness of rubber bushings 7d and the diameter of shaft 8c. As between the hubs 5 and 10c, 11c of the opposing arms, the relative angular freedom is likewise dependent on transverse disposition and hardness of rubber bushings 9c, and the diameter of hub 5. Thus it will be seen that a wide range of controlled angular freedom may be provided by all forms of the invention, in the relative alignment of wheels or of transverse axles at the free ends of the four opposing arms of the suspension, wherein uneven terrain and/or, self-steering are factors. The construction of the structure shown in FIGS. 8a and 8b provides equal load distribution with opposing suspension arms of equal load length, and with cross leveling between like arms 4c on opposite sides of a vehicle; and, where the wheels are mounted parallel adjacent the free ends of the arms, self-steering is feasible.

While various changes may be made in the detail construction, it shall be understood that such changes shall be within the spirit and scope of the present invention as defined by the appended claims.

What is claimed is:

1. In combination, a mobile body frame, a pair of torque reactive opposing arms structures connected respectively to the body frame at the opposite sides thereof, each structure comprising concentrically-disposed hubs, longitudinally-aligned arms respectively extending substantially radially from the outermost portion of said concentrically-disposed hubs, one arm extending forwardly from one of the hubs and the opposing arm extending rearwardly from the other hub, both arms running substantially parallel to the longitudinal axis of the body frame, means resilient torsionally, radially, axially, and angularly interconnecting the body frame and one of the concentrically-disposed hubs and means resilient torsionally, radially, axially and angularly relative to a common center axis of the hubs and interconnecting said concentrically-disposed hubs, and wheel supported axles respectively connected to the respective free ends of the opposing arms of said torque reactive structures.

2. The combination as defined in claim 1, and said axles transversely extending across the body frame and between corresponding arms of the respective structures, said axles being spaced longitudinally of the frame with respect to each other.

3. The combination as defined in claim 1, and all of said resilient means consisting of rubber-like tubular bushings bonded to the interconnecting support and hubs.

4. In combination, a vehicle body frame, wheel-supporting means disposed transversely of the vehicle body frame, torque-reactive opposing arm structures respectively disposed at the opposite sides of the vehicle body frame, each of said opposing arm structures comprising hubs disposed within one another, opposing arms respectively extending substantially radially from the outermost portion of their respective hubs, one arm extending forwardly from one of the hubs and the opposing arm extending rearwardly from the other hub, means resilient torsionally, radially, axially and angularly relative to a common center axis of the hubs and interconnecting the concentric hubs, and means for resiliently connecting each structure by the inner one of its hubs to the vehicle body framing.

5. The combination as defined in claim 4, and said inner hub connecting means being torsionally, radially, axially and angularly resilient relative to a common center axis of the hubs.

6. The combination as defined in claim 5, and both of said resilient means consisting of rubber-like tubular bushings bonded to the hubs and the body frame, said hubs and bushings being concentrically disposed upon one another, and the bushing interconnecting the oppositely operative hubs being offset laterally to one side of the opposing arms.

7. In combination, a vehicle body frame, wheel supported structures disposed respectively transversely of said frame at opposite sides thereof, pairs of longitudinally aligned torque reactive opposing support arms, a pivotally disposed nested hub on each of said arms one disposed within the other of a pair, means resilient torsionally, radially, axially and angularly relative to a common center axis of the hubs and interconnecting both of said hubs of each pair of opposing arms, and means for connecting the inner one of said hubs to said vehicle body frame.

8. The combination defined in claim 7, and said inner connecting means being torsionally, radially, axially and angularly resilient relative to a common axis of the hubs.

9. In combination, a vehicle body frame having sleeve supports at the opposite sides thereof, torque reactive opposing arm structures respectively connected to the sleeve supports, each of the opposing arm structures comprising two concentric hubs and longitudinally-aligned support arms extending respectively from the respective hubs but in opposite directions therefrom, a resilient bushing interconnecting the vehicle sleeve support and one of the hubs, another bushing interconnecting two hubs, the bushing interconnecting the sleeve support and the one hub having less angular deflection than the bushing interconnecting the two hubs.

References Cited in the file of this patent

UNITED STATES PATENTS

| | | |
|---|---|---|
| 1,930,208 | Marcum | Oct. 10, 1933 |
| 1,964,735 | Knox | July 3, 1934 |
| 2,051,864 | Knox | Aug. 25, 1936 |
| 2,149,297 | Knox | Mar. 7, 1939 |
| 2,251,698 | Willson | Aug. 5, 1941 |